(12) United States Patent
Dore et al.

(10) Patent No.: US 11,191,133 B2
(45) Date of Patent: Nov. 30, 2021

(54) DIRECT HEATING THROUGH PATCH ANTENNAS

(71) Applicant: WHIRLPOOL CORPORATION, Benton Harbor, MI (US)

(72) Inventors: Giovanni Dore, Arezzo (IT); Francesco Giordano, Cremona (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/512,233

(22) PCT Filed: Sep. 17, 2014

(86) PCT No.: PCT/US2014/056067
§ 371 (c)(1),
(2) Date: Mar. 17, 2017

(87) PCT Pub. No.: WO2016/043731
PCT Pub. Date: Mar. 24, 2016

(65) Prior Publication Data
US 2017/0251530 A1 Aug. 31, 2017

(51) Int. Cl.
*H05B 6/72* (2006.01)
*H05B 6/64* (2006.01)
(Continued)

(52) U.S. Cl.
CPC ............... *H05B 6/72* (2013.01); *H05B 6/645* (2013.01); *H05B 6/686* (2013.01); *H05B 6/687* (2013.01);
(Continued)

(58) Field of Classification Search
CPC ........ H05B 6/645; H05B 6/686; H05B 6/702; H05B 6/705; H05B 6/687; H05B 6/72;
(Continued)

(56) References Cited

U.S. PATENT DOCUMENTS 2,742,612 A 4/1956 Cohn
2,956,143 A 10/1960 Schall
(Continued)

FOREIGN PATENT DOCUMENTS

CN 101118425 2/2008
CN 201081287 Y 7/2008
(Continued)

OTHER PUBLICATIONS

Translation of JP2010073383A, Microwave Heating Apparatus, Japan Patent Office, (Year: 2010).*

*Primary Examiner* — Quang T Van
(74) *Attorney, Agent, or Firm* — Price Heneveld LLP

(57) ABSTRACT

The microwave heating apparatus (100) includes a cavity (101) arranged to receive a load (102A, 102B), at least two patch antennas (103A, 103B) coupled to the at least one microwave generator (104), and a control unit (105). Each of the at least two patch antennas (103A, 103B) is configured to radiate microwaves into a predefined direct heating zone (108A, 108B) within the cavity proximate the respective patch antenna (103A, 103B). The control unit (105) is configured to select energy levels for each of the at least two patch antennas (103A, 103B) as if the load (102A, 102B) were static and as if there not interference between the at least two patch antennas (103A, 103B).

14 Claims, 3 Drawing Sheets

(51) Int. Cl.
*H05B 6/68* (2006.01)
*H05B 6/70* (2006.01)

(52) U.S. Cl.
CPC ............ *H05B 6/702* (2013.01); *H05B 6/705* (2013.01); *H05B 2206/044* (2013.01); *Y02B 40/00* (2013.01)

(58) Field of Classification Search
CPC ............ H05B 2206/044; Y02B 40/143; Y02B 40/146
USPC ....... 219/748, 761, 746, 747, 750, 697, 695, 219/690, 660, 600, 702; 330/295, 107 R; 331/110
See application file for complete search history.

(56) References Cited

U.S. PATENT DOCUMENTS

| | | |
|---|---|---|
| 2,958,754 A | 11/1960 | Hahn |
| 2,981,904 A | 4/1961 | Ajioka et al. |
| 3,260,832 A | 7/1966 | Johnson |
| 3,265,995 A | 8/1966 | Hamasaki |
| 3,440,385 A | 4/1969 | Smith |
| 3,489,135 A | 1/1970 | Astrella |
| 3,536,129 A | 10/1970 | White |
| 3,639,717 A | 2/1972 | Mochizuki |
| 3,731,035 A | 5/1973 | Jarvis et al. |
| 3,737,812 A | 6/1973 | Gaudio et al. |
| 3,812,316 A | 5/1974 | Milburn |
| 4,000,390 A | 12/1976 | Graff |
| 4,088,861 A | 5/1978 | Zwillinger |
| D248,607 S | 7/1978 | Yamamura et al. |
| 4,101,750 A | 7/1978 | Doner |
| 4,107,502 A | 8/1978 | Tanaka et al. |
| 4,136,271 A | 1/1979 | Tanaka et al. |
| 4,139,828 A | 2/1979 | Commault et al. |
| 4,143,646 A | 3/1979 | Sampsel et al. |
| 4,166,207 A | 8/1979 | Burke |
| 4,196,332 A | 1/1980 | MacKay et al. |
| 4,264,800 A | 4/1981 | Jahnke et al. |
| 4,283,614 A | 8/1981 | Tanaka et al. |
| 4,321,445 A | 3/1982 | Kristof et al. |
| 4,354,562 A | 10/1982 | Newman |
| D268,079 S | 3/1983 | Miyake et al. |
| 4,463,324 A | 7/1984 | Rolfs |
| D275,546 S | 9/1984 | Tanaka et al. |
| D276,122 S | 10/1984 | Tanaka et al. |
| D277,355 S | 1/1985 | Miyake et al. |
| 4,595,827 A | 6/1986 | Hirai et al. |
| D285,893 S | 9/1986 | Mizuma et al. |
| 4,673,800 A | 6/1987 | Hirai et al. |
| 4,703,151 A | 10/1987 | Sakamoto |
| 4,743,728 A | 5/1988 | Nagafusa et al. |
| D297,698 S | 9/1988 | Nishikawa et al. |
| D297,800 S | 9/1988 | Feil et al. |
| 4,786,774 A | 11/1988 | Kaminaka |
| D303,063 S | 8/1989 | Satake |
| 4,870,238 A | 9/1989 | Hodgetts et al. |
| 4,886,046 A | 12/1989 | Welch et al. |
| 4,937,413 A | 6/1990 | Spruytenburg et al. |
| 4,999,459 A | 3/1991 | Smith et al. |
| 5,075,525 A | 12/1991 | Jung |
| D330,144 S | 10/1992 | Takebata et al. |
| 5,369,254 A | 11/1994 | Kwon |
| D353,511 S | 12/1994 | Saimen |
| 5,483,045 A | 1/1996 | Gerling |
| 5,546,927 A | 8/1996 | Lancelot |
| 5,558,800 A * | 9/1996 | Page .................. H05B 6/72 219/695 |
| D378,723 S | 4/1997 | Weiss |
| 5,619,983 A | 4/1997 | Smith |
| D385,155 S | 10/1997 | Weiss et al. |
| 5,735,261 A | 4/1998 | Kieslinger |
| 5,878,910 A | 3/1999 | Gibernau et al. |
| D411,074 S | 6/1999 | Sakai et al. |
| 5,919,389 A | 7/1999 | Uehashi et al. |
| 5,928,540 A | 7/1999 | Antoine et al. |
| 5,973,305 A | 10/1999 | Kim et al. |
| 5,981,929 A | 11/1999 | Maeda et al. |
| 6,018,158 A | 1/2000 | Kang |
| 6,054,696 A | 4/2000 | Lewis et al. |
| 6,097,019 A | 8/2000 | Lewis et al. |
| 6,268,593 B1 | 7/2001 | Sakai |
| D481,582 S | 11/2003 | Seum et al. |
| 6,664,523 B1 | 12/2003 | Kim et al. |
| 6,696,678 B2 | 2/2004 | Hudson et al. |
| D495,556 S | 9/2004 | Milrud et al. |
| D521,799 S | 5/2006 | Ledingham et al. |
| D522,801 S | 6/2006 | Lee |
| D527,572 S | 9/2006 | Lee et al. |
| 7,105,787 B2 | 9/2006 | Clemen, Jr. |
| 7,111,247 B2 | 9/2006 | Choi et al. |
| D530,973 S | 10/2006 | Lee et al. |
| D531,447 S | 11/2006 | Lee et al. |
| D532,645 S | 11/2006 | Lee |
| 7,193,195 B2 | 3/2007 | Lundstrom et al. |
| D540,105 S | 4/2007 | Lee et al. |
| D540,613 S | 4/2007 | Jeon |
| D550,024 S | 9/2007 | Jeon |
| 7,361,871 B2 | 4/2008 | Cho et al. |
| D568,675 S | 5/2008 | Kawata |
| 7,482,562 B2 | 1/2009 | Song et al. |
| D586,619 S | 2/2009 | Pino et al. |
| D587,959 S | 3/2009 | Hensel |
| 7,556,033 B2 | 7/2009 | Kim |
| D602,306 S | 10/2009 | Lavy |
| 7,770,985 B2 | 8/2010 | Davis et al. |
| D625,557 S | 10/2010 | Pino et al. |
| D626,370 S | 11/2010 | Baek |
| 7,919,735 B2 | 4/2011 | Kiyono et al. |
| 7,926,313 B2 | 4/2011 | Schenkl et al. |
| D638,249 S | 5/2011 | Ryan et al. |
| 8,074,637 B2 | 12/2011 | Yamauchi |
| D655,970 S | 3/2012 | De'Longhi |
| D658,439 S | 5/2012 | Curtis et al. |
| D662,759 S | 7/2012 | Blacken et al. |
| D663,156 S | 7/2012 | Curtis et al. |
| D670,529 S | 11/2012 | Hensel |
| D673,000 S | 12/2012 | De'Longhi |
| D673,418 S | 1/2013 | Lee et al. |
| D678,711 S | 3/2013 | Reiner |
| 8,389,916 B2 | 3/2013 | Ben-Shmuel et al. |
| 8,455,803 B2 | 6/2013 | Danzer et al. |
| 8,492,686 B2 | 7/2013 | Bilchinsky et al. |
| 8,610,038 B2 | 12/2013 | Hyde et al. |
| D717,579 S | 11/2014 | Gregory et al. |
| 9,040,879 B2 | 5/2015 | Libman et al. |
| D736,554 S | 8/2015 | Steiner et al. |
| D737,620 S | 9/2015 | Miller et al. |
| D737,622 S | 9/2015 | Miller et al. |
| 9,131,543 B2 | 9/2015 | Ben-Shmuel et al. |
| 9,132,408 B2 | 9/2015 | Einziger et al. |
| 9,179,506 B2 | 11/2015 | Sim et al. |
| 9,210,740 B2 | 12/2015 | Libman et al. |
| 9,215,756 B2 | 12/2015 | Bilchinsky et al. |
| 9,351,347 B2 | 5/2016 | Torres et al. |
| 9,374,852 B2 | 6/2016 | Bilchinsky et al. |
| D769,669 S | 10/2016 | Kim et al. |
| 9,560,699 B2 | 1/2017 | Zhylkov et al. |
| 2005/0162335 A1 | 7/2005 | Ishii |
| 2009/0134155 A1 | 5/2009 | Kim et al. |
| 2010/0059509 A1* | 3/2010 | Imai .................. H05B 6/68 219/690 |
| 2010/0176121 A1 | 7/2010 | Nobue et al. |
| 2010/0187224 A1 | 7/2010 | Hyde et al. |
| 2011/0108548 A1* | 5/2011 | Nobue .................. H05B 6/6402 219/702 |
| 2011/0168699 A1 | 7/2011 | Oomori et al. |
| 2011/0290790 A1 | 12/2011 | Sim et al. |
| 2011/0297672 A1* | 12/2011 | Niklasson ............ H05B 6/6402 219/702 |
| 2012/0067872 A1 | 3/2012 | Libman et al. |
| 2012/0103972 A1 | 5/2012 | Okajima |
| 2012/0152939 A1 | 6/2012 | Nobue et al. |

(56) References Cited

U.S. PATENT DOCUMENTS

| | | |
|---|---|---|
| 2012/0160830 A1 | 6/2012 | Bronstering |
| 2013/0048881 A1 | 2/2013 | Einziger et al. |
| 2013/0080098 A1 | 3/2013 | Hadad et al. |
| 2013/0156906 A1 | 6/2013 | Raghavan et al. |
| 2013/0186887 A1 | 7/2013 | Hallgren et al. |
| 2014/0197161 A1 | 7/2014 | Dobie |
| 2014/0203012 A1 | 7/2014 | Corona et al. |
| 2014/0208957 A1 | 7/2014 | Imai et al. |
| 2014/0277100 A1 | 9/2014 | Kang |
| 2015/0070029 A1 | 3/2015 | Libman et al. |
| 2015/0136760 A1* | 5/2015 | Lima .................. H05B 6/705 219/709 |
| 2015/0156827 A1 | 6/2015 | Ibragimov et al. |
| 2015/0271877 A1 | 9/2015 | Johansson |
| 2015/0305095 A1 | 10/2015 | Huang et al. |
| 2015/0334788 A1 | 11/2015 | Hofmann et al. |
| 2015/0373789 A1 | 12/2015 | Meusburger et al. |
| 2016/0029442 A1 | 1/2016 | Houbloss et al. |
| 2016/0119982 A1 | 4/2016 | Kang et al. |
| 2016/0219656 A1 | 7/2016 | Hunter, Jr. |
| 2016/0327281 A1 | 11/2016 | Bhogal et al. |
| 2016/0353528 A1 | 12/2016 | Bilchinsky et al. |

FOREIGN PATENT DOCUMENTS

| | | |
|---|---|---|
| CN | 102012051 A | 4/2011 |
| CN | 102620324 A | 8/2012 |
| CN | 103156532 A | 6/2013 |
| CN | 203025135 U | 6/2013 |
| DE | 3238441 A1 | 4/1984 |
| DE | 102004002466 A1 | 8/2005 |
| DE | 102008042467 A1 | 4/2010 |
| EP | 0199264 A2 | 10/1986 |
| EP | 3493623 A1 | 8/1992 |
| EP | 1424874 A2 | 6/2004 |
| EP | 1426692 A2 | 6/2004 |
| EP | 1471773 A2 | 10/2004 |
| EP | 1732359 A2 | 12/2006 |
| EP | 1970631 A2 | 9/2008 |
| EP | 2031938 A1 | 3/2009 |
| EP | 2205043 A1 | 7/2010 |
| EP | 2230463 A1 | 9/2010 |
| EP | 2220913 B1 | 5/2011 |
| EP | 2512206 A1 | 10/2012 |
| EP | 2405711 A2 | 11/2012 |
| EP | 2618634 | 7/2013 |
| EP | 2775794 A1 | 9/2014 |
| EP | 2906021 A1 | 8/2015 |
| EP | 2393339 B1 | 12/2016 |
| FR | 2766272 A1 | 1/1999 |
| GB | 639470 A | 6/1950 |
| GB | 1424888 | 2/1976 |
| GB | 2158225 A | 11/1985 |
| GB | 2193619 A | 2/1988 |
| GB | 2367196 A | 3/2002 |
| JP | S55155120 A | 12/1980 |
| JP | 57194296 U | 12/1982 |
| JP | 59226497 A | 12/1984 |
| JP | H0510527 A | 1/1993 |
| JP | H06147492 | 5/1994 |
| JP | 8-171986 | 7/1996 |
| JP | 2000304593 A | 11/2000 |
| JP | 2008108491 A | 5/2008 |
| JP | 201073383 | 4/2010 |
| JP | 2011124049 A | 6/2011 |
| JP | 2011146143 A | 7/2011 |
| JP | 2013037795 | 2/2013 |
| JP | 2013073710 A | 4/2013 |
| KR | 2050002121 | 7/2005 |
| KR | 101359460 B1 | 2/2014 |
| KR | 20160093858 A | 8/2016 |
| RU | 2122338 C1 | 11/1998 |
| RU | 2003122979 A | 2/2005 |
| RU | 2008115817 A | 10/2009 |
| RU | 2008137844 | 3/2010 |
| WO | 8807805 A1 | 10/1988 |
| WO | 0036880 | 6/2000 |
| WO | 02065036 A1 | 8/2002 |
| WO | 03077601 A1 | 9/2003 |
| WO | 2008018466 A1 | 2/2008 |
| WO | 2008102360 | 8/2008 |
| WO | 2009039521 A1 | 3/2009 |
| WO | 2009157110 A1 | 12/2009 |
| WO | 2011138680 | 11/2011 |
| WO | 2010032345 | 2/2012 |
| WO | 2011039961 A1 | 2/2013 |
| WO | 2015024177 A1 | 2/2015 |
| WO | 2015099648 A1 | 7/2015 |
| WO | 2015099650 A1 | 7/2015 |
| WO | 2015099651 A1 | 7/2015 |
| WO | 2016128088 A1 | 8/2016 |
| WO | 2017190792 A1 | 11/2017 |

* cited by examiner ic heating in which a high-frequency alternating electromagnetic field is distributed throughout an enclosed cavity. A sub-band of the radio frequency spectrum, microwave frequencies at or around 2.45 GHz cause dielectric heating primarily by absorption of energy in water.

DIRECT HEATING THROUGH PATCH ANTENNAS

TECHNICAL FIELD

The present disclosure relates to the field of radio frequency heating, and in particular, to a radio frequency heating apparatus for heating a load such as food.

BACKGROUND

A conventional microwave oven cooks food by a process of dielectric heating in which a high-frequency alternating electromagnetic field is distributed throughout an enclosed cavity. A sub-band of the radio frequency spectrum, microwave frequencies at or around 2.45 GHz cause dielectric heating primarily by absorption of energy in water.

To generate microwave frequency radiation in a conventional microwave oven, a voltage applied to a high-voltage transformer results in a high-voltage power that is applied to a magnetron that generates microwave frequency radiation. The microwaves are then transmitted to an enclosed cavity containing the food through a waveguide. Cooking food in an enclosed cavity with a single, non-coherent source like a magnetron may result in non-uniform heating of the food. To more evenly heat food, microwave ovens include, among other things, mechanical solutions such as a microwave stirrer and a turntable for rotating the food.

Another approach for providing uniform heating is based on the introduction of solid-state power generation technology for microwave cooking systems. Solid-state power generation typically includes one or more coherent radio frequency power sources or applicators that force specific electric field patterns via controlled combinations of constructive and destructive interference (i.e. field-shaping) within a cooking cavity. One example is disclosed in US Patent Application Number 2013/0186887 entitled "Microwave Heating Apparatus" to Hallgren et al. which teaches the formation of a heating pattern with zones of different intensities that is accomplished by combining mode fields from a plurality of feed ports. Field-shaping requires complex control strategies that strongly depend upon knowledge of properties related to the food being cooked such as its precise position within the cavity as well as other physical and electromagnetic characteristics.

Thus, there is a need for new apparatus and methods that would overcome or at least alleviate some of the above mentioned drawbacks.

BRIEF DESCRIPTION

In one aspect, a microwave heating apparatus is provided. The microwave heating apparatus comprises a cavity arranged to receive a load, at least two patch antennas coupled to the at least one microwave generator, and a control unit. Each of the at least two patch antennas is configured to radiate microwaves into a predefined direct heating zone within the cavity proximate the respective patch antenna. The control unit is configured to select energy levels for each of the at least two patch antennas as if the load were static and as if there not interference between the at least two patch antennas.

DETAILED DESCRIPTION

Figure 1:
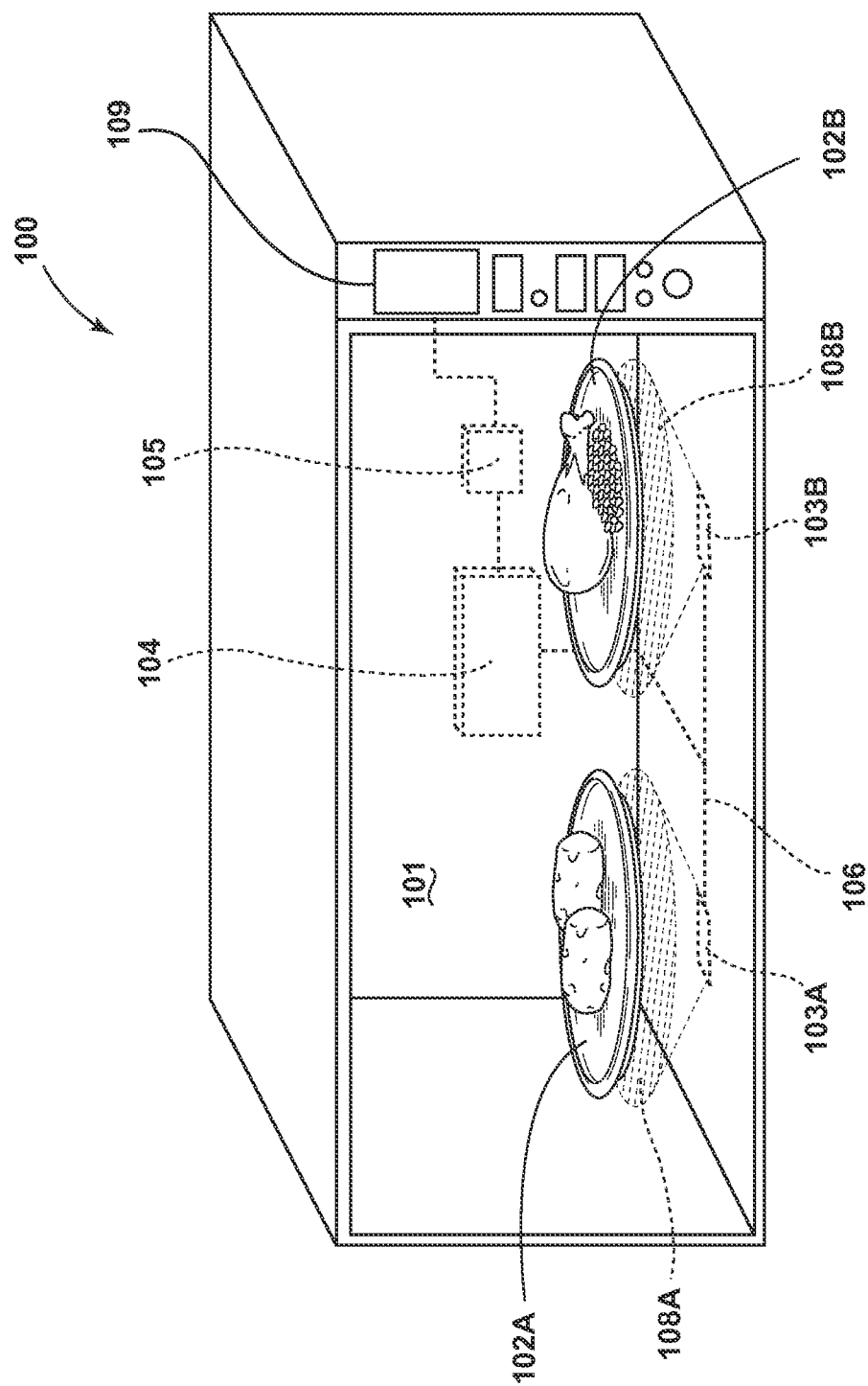
FIG. 1 schematically illustrates a microwave heating apparatus according to an embodiment of the present disclosure.

FIG. 1 shows a microwave heating apparatus 100 that includes a cavity 101 arranged to receive one or more loads 102A, 102B. The microwave heating apparatus 100 includes at least two patch antennas 103A, 103B for feeding microwaves from one or more microwave generators 104 to the cavity 101. Communicatively coupled to the microwave generators (shown collectively as 104), a control unit 105 is configured to select energy levels for each of the patch antennas 103A, 103B and control the microwave generators 104 to transmit electric power to the patch antennas 103A, 103B. The patch antennas 103A, 103B convert the electric power to microwaves that are radiated into the cavity 101. The configuration and operation of the patch antennas 103A, 103B are selected such that each patch antenna 103A, 103B defines a direct heating zone 108A, 108B respectively.

For feeding microwaves the microwave generators 104 to the cavity 101, the microwave heating apparatus 100 may include transmission lines 106. The transmission lines 106 are arranged between the microwave generators 104 and the cavity 101 for transmission of microwave frequency electric power to the patch antennas 103A, 103B. The microwave generators 104, preferably of a solid-state design, are arranged with at the respective first ends of the transmission line 106 while the patch antennas 103A, 103B are arranged at the second ends opposite the first ends of the transmission lines 106. The microwave generators 104 are adapted to generate microwave frequency electric power and the transmission lines 106 are configured to transmit the generated microwave frequency electric power from the microwave generator 104 to the patch antennas 103A, 103B. The transmission lines 106 may preferably be coaxial cables. However, any transmission line capable of transmitting microwave frequency power may be implemented including, but not limited to, wire transmission lines, rectax, microstrip or stripline transmission lines.

In general, each of the microwave generators 104 may be associated with a single patch antenna 103A, 103B (with a corresponding transmission line 106 of which some or all may be completely dedicated to a respective patch antenna and microwave generator). In this way, the intensity of the microwave frequency power transmitted from and reflected to each of the microwave generators 104 may be separately monitored.

The cavity 101 of the microwave heating apparatus 100 defines an enclosing surface wherein one of the side walls of the cavity 101 may be equipped with a door (not shown in FIG. 1, but the door may be suitably arranged at the open side of the depicted cavity 101) for enabling the introduction of one or more loads 102A, 102B, that is food items, in the cavity 101. The cavity 101 is shown with the shape of a rectangular parallelpiped. Typical dimensions for the cavity include a width on the order of about 45 to 60 cm and a height of approximately 40 cm. Other shapes and sizes are contemplated for the cavity 101 and include, but are not limited to, polyhedron, cylinder, sphere, etc. or combinations thereof.

As shown, the microwave generators 104 may be mounted on the rear wall of the cavity 101. However, the microwave generators 104 may be mounted on the right wall, the left wall, the ceiling or underneath the cavity 101. Alternatively, the microwave generators 104 may not be mounted to the cavity 101 at all, but elsewhere in the microwave heating apparatus 100 between the cavity 101 and a surrounding enclosure (not shown). Each microwave generator 104 may be mounted such that, depending upon the implementation, the location of each microwave generator 104 may be selected to be advantageously positioned in light of a manufacturing procedure or cost-savings operation. The arrangement of patch antennas 103A, 103B and microwave generators 104 described herein with reference to FIG. 1 is only provided as an example and is not limiting. It will be appreciated that more than two patch antennas 103A, 103B may be provided and also that the microwave heating apparatus 100 may include any number of microwave generators 104 to provide flexibility in providing multiple direct heating zones 108A, 108B.

The control unit 105 may be included in the microwave heating apparatus 100, which may be operably coupled with various components of the microwave heating apparatus 100 to implement a cooking cycle for a load 102A, 102B positioned in one or more direct heating zones 108A, 108B. The control unit 105 may also be operably coupled with a control panel or human-machine interface 109 for receiving user-selected inputs and communicating information to a user. The human-machine interface 109 may include operational controls such as dials, lights, switches, touch screen elements, and displays enabling a user to input commands, such as a cooking cycle applicable to one or more direct heating zones 108A, 108B, to the control unit 105 and receive information. The human-machine interface 109 may include one or more elements, which may be centralized or dispersed relative to each other.

The control unit 105 may be provided with a memory and a central processing unit (CPU), and may be preferably embodied in a microcontroller. The memory may be used for storing control software that may be executed by the CPU in completing a cooking cycle for one or more direct heating zones 108A, 108B as well as a cooking cycle applicable to the entire cavity 101. For example, the memory may store one or more pre-programmed cooking cycles that may be selected by a user and completed by the microwave heating apparatus 100. The control unit 105 may also receive input from one or more sensors. Non-limiting examples of sensors that may be communicably coupled with the control unit 105 include peak level detectors for measuring microwave power levels and temperature sensors for measuring the temperature of the enclosed cavity 101 or one or more high-power amplifiers included in the microwave generators 104.

Based on the user input provided by the human-machine interface 109 and data that may include the incident and reflected power magnitudes for each of the microwave generators 104 or the temperature inside one or more portions of the cavity 101, the control unit 105 may determine the settings for microwave generators 104. In this way, one of the main functions of control unit 105 is to actuate the microwave heating apparatus 100 to instantiate a cooking cycle as initiated by the user.

The microwave power generated by the microwave generators 104 are fed to the patch antennas 103A, 103B. The patch antennas 103A, 103B convert the microwave power to microwave radiation that is transmitted into the cavity 101 at substantially the direct heating zones 108A, 108B respectively. That is, the direct heating zone 108A, 108B is a region in the cavity 101 proximate a patch antenna 103A, 103B where the patch antenna 103A, 103B directs the strongest emission of radiated microwave energy. Additionally, by placing a load 102A, 102B on the direct heating zone 108A, 108B, the microwave radiation is directly incident on the load 102A, 102B. In other words, due to the directivity of the patch antenna 103A, 103B and the proximity of the load 102A, 102B to the patch antenna 103A, 103B, a substantial fraction of the transmitted microwave radiation directly interacts with the load 102A, 102B such that modal effects resulting from the resonant cavity 101 and patch antenna cross-talk may be ignored in the direct heating zone 108A, 108B. By positioning the load 102A, 102B in the direct heating zone 108A, 108B within the cavity 101, the load 102A, 102B is exposed to a high magnitude electric field that forces microwave heating of the load 102A, 102B by direct radiation of the electromagnetic waves.

Surprisingly, in both simulation and under test, it has been found that by positioning a load in a direct heating zone, a patch antenna may transfer a substantial portion of the energy delievered to a load positioned in correspondence with said patch antenna. It is believed the result is achieved, in part, by taking advantage of the directivity of the patch antennas used to feed the cavity. Testing has demonstrated that by positioning two loads (i.e. 0.5 L water for each load) at a fixed distance from the two patch antennas spatially displaced in a manner consistent with FIG. 1, each patch antenna may transfer approximately 85% more energy to the first load 102A in the first direct heating zone 108A directly exposed to the first patch antenna 103A with respect to the second load 102B in the second heating zone 108B directly exposed to the second patch antenna 103B.

Figure 2:
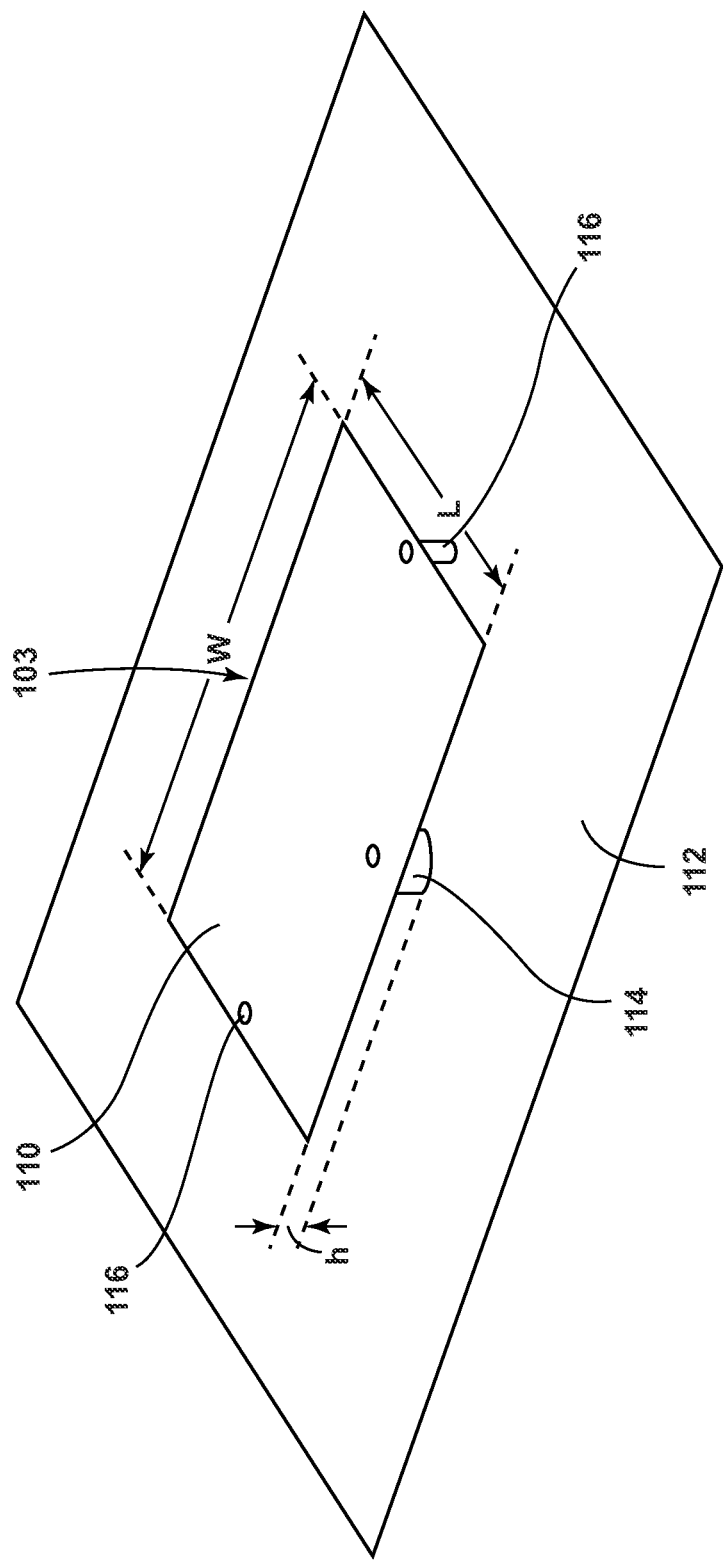
FIG. 2 illustrates a perspective view of a patch antenna in the microwave heating apparatus of FIG. 1.
Figure 3:
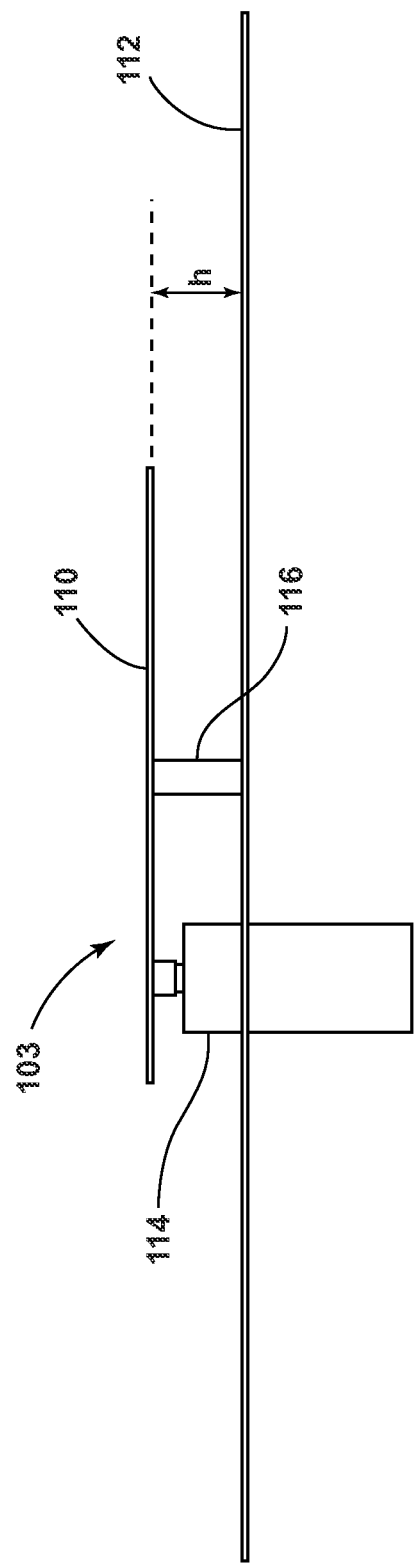
FIG. 3 illustrates a side view of a patch antenna in the microwave heating apparatus of FIG. 1.

Referring now to FIGS. 2 and 3, a patch antenna 103 for the microwave heating apparatus of FIG. 1 is shown. The patch antenna 103 is a microstrip patch antenna that comprises a radiating element, i.e. the patch 110, separated a distance h from a parallel ground plane 112 by metallic posts 116. The patch 110 is directly coupled to a microwave generating source through a probe 114. Both the patch 110 and the ground plane 112 are conductive plates and are preferably formed of steel or copper.

The probe 114 may include any type of standard or bespoke probe capable of transferring microwave frequency power and preferably includes an N-type connector. In this way, the patch antenna 103 may be fed with any of the contacting or noncontacting feed techniques known in the art and include microstrip line, coaxial probe, aperture coupling, proximity coupling, etc.

The dimensions of the patch 110 include a width, W and a length, L. Selection of these dimensions along with the distance, h, the position of the probe 114 and the position of the metallic posts 116 determines the electromagnetic characteristics of the patch antenna 103 related to the center frequency and operable bandwidth of the patch antenna 103. For example, the patch antenna 103 may include a patch sized with dimensions L, W at a distance h from the ground plane 112 such that the patch antenna 103 radiates over the frequencies ranging from 2.4 GHz to 2.5 GHz. The patch 110 may be sized with a length of approximately 6.125 cm range, though the length may range from 5 to 10 cm depending upon the implementation. The patch 110 may be sized with a width of approximately 8.3 cm range, though the length may range from 5 to 10 cm depending upon the implementation. The distance h separating the ground plane 112 and the patch 110 may be approximately 6 mm, though the distance may range from approximately 5 to 10 mm.

Alternatively, the patch antenna 103 may include dimensions for operating in other frequencies and bandwidths. While described above for frequencies ranging from 2.4 GHz to 2.5 GHz, the patch antenna 103 may be configured to transmit other electromagnetic frequency bands. For example, the bandwidth of frequencies between 2.4 GHz and 2.5 GHz is one of several bands that make up the industrial, scientific and medical (ISM) radio bands. The transmission of other electromagnetic frequency bands is contemplated and may include non-limiting examples contained in the ISM bands defined by the frequencies: 13.553 MHz to 13.567 MHz, 26.957 MHz to 27.283 MHz, 902 MHz to 928 MHz, 5.725 GHz to 5.875 GHz and 24 GHz to 24.250 GHz.

Additionally, while typical microstrip patch antenna designs include a substrate with a thickness equivalent to the distance, h, placed between the patch 110 and the ground plane 112, the patch antenna 103 includes an absence of a dielectric substrate (i.e. an air gap) between the patch 110 and the ground plane 112. Advantageously, it is contemplated the absence of a dielectric substrate between the ground plane 112 and the patch 110 minimizes power dissipation because there are no dielectric losses associated with the patch antenna 103 and, consequently, the patch antenna 103 achieves a high efficiency.

As described above, the patch antenna 103 includes a directivity that defines the direct heating zones in the microwave. Recall that the directivity of an antenna is a measure of the power density that the antenna radiates in the direction of its strongest emission as compared to the power density radiated by an ideal isotropic radiator. Directivity is inversely proportional to beamwidth. Therefore, for a patch antenna 103 to directly heat a load placed in a direct heating zone, the patch antenna 103 includes dimensions and characteristics such that the beamwidth for the operable frequency band are commensurate with the dimensions of the desired direct heating zone. Factors that increase the directivity (i.e. narrows the beamwidth) of the patch antenna 103 include decreasing permittivity of the substrate, increasing the distance, h, and increasing the width, W of the patch antenna. In this way, by replacing the substrate typical to patch antennas with an air gap, the permittivity is minimized and the beamwidth of the patch antenna 103 depends on the distance h between the patch 110 and the ground plane 112 and the width W of the patch 110.

While described above as a singular element, each patch antenna 103 may include multiple patch antenna elements to form an array. Arrays of patch antenna elements may be placed in close proximity and controlled to act as a single element with increased directivity. Additionally, while described above as having two patch antennas 103A, 103B, the microwave heating apparatus may include more patch antennas spatially distributed in the cavity to define additional direct heating zones.

Benefits of a microwave heating apparatus with the above described patch antennas as contrasted to a magnetron-based system include include a lightweight, low cost design that is integrable with solid state microwave integrated circuit technology. Patch antennas support linear and circular polarization and are integratable with solid state microwave integrated circuit technologies and are mechanically robust.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A microwave heating apparatus comprising:
   a cavity arranged to receive a first load and a second load, the cavity defined within a plurality of walls;
   at least one microwave generator that transmits electric power;
   a first patch antenna coupled to the at least one microwave generator to receive the electric power from the at least one microwave generator, wherein the first patch antenna is configured to convert the electric power into microwaves radiated into a first predefined direct heating zone within the cavity proximate the first patch antenna;
   a second patch antenna coupled to the at least one microwave generator to receive the electric power from the at least one microwave generator, wherein the second patch antenna is configured to convert the electric power into microwaves radiated into a second predefined direct heating zone within the cavity proximate the second patch antenna, wherein the first patch antenna and the second patch antenna are both mounted to one of the plurality of walls defining the cavity and are spaced apart from one another whereby the first predefined direct heating zone is configured to receive the first load for direct heating by the first patch antenna and the second predefined direct heating zone is configured to receive the second load for direct heating by the second patch antenna; and
   a control unit configured to select energy levels for each of the at least two patch antennas as if the load were static and as if there was no interference between the first and second patch antennas,
   wherein the first and second patch antennas each include a patch element separated from a ground plane element with an air gap, wherein the separation between the patch element and the ground plane ranges from approximately 5 mm to 10 mm, and wherein the patch element is rectangular with a width ranging from 5 cm to 10 cm.

2. The microwave heating apparatus of claim 1, wherein the at least one microwave generator includes a solid-state microwave generator.

3. The microwave heating apparatus of claim 1, wherein the patch element is rectangular with a width of approximately 8.3 cm and a length of approximately 6.125 cm.

4. The microwave heating apparatus of claim 1, wherein the patch element has a length ranging from approximately 5 cm to 10 cm.

5. The microwave heating apparatus of claim 1, wherein the separation between the patch element and the ground plane is approximately 6 mm.

6. The microwave heating apparatus of claim 1, wherein the first and second patch antennas each include a plurality of patch elements spaced in an array.

7. The microwave heating apparatus of claim 1, wherein the first patch antenna has a directivity such that a corresponding beamwidth substantially directs the radiated microwaves into the first predefined heating zone proximate the first patch antenna, and wherein the second patch antenna has a directivity such that a corresponding beamwidth substantially directs the radiated microwaves into the second predefined heating zone proximate the second patch antenna.

8. The microwave heating apparatus of claim 1, wherein the first and second patch antennas are located in one of the plurality of walls that defines the bottom of the cavity.

9. The microwave heating apparatus of claim 1, wherein the at least one microwave generator is configured to output electric power ranging in frequency from 2.4 GHz to 2.5 GHz.

10. A microwave heating apparatus comprising:
a cavity arranged to receive a first load and a second load, the cavity defined within a plurality of walls;
at least one microwave generator that transmits electric power;
a first patch antenna coupled to the at least one microwave generator to receive the electric power from the at least one microwave generator, wherein the first patch antenna is configured to convert the electric power into microwaves radiated into a first predefined direct heating zone within the cavity proximate the first patch antenna;
a second patch antenna coupled to the at least one microwave generator to receive the electric power from the at least one microwave generator, wherein the second patch antenna is configured to convert the electric power into microwaves radiated into a second predefined direct heating zone within the cavity proximate the second patch antenna, wherein the first patch antenna and the second patch antenna are both mounted to one of the plurality of walls defining the cavity and are spaced apart from one another whereby the first predefined direct heating zone is configured to receive the first load for direct heating by the first patch antenna and the second predefined direct heating zone is configured to receive the second load direct heating by the second patch antenna; and
a control unit configured to select energy levels for each of the first and second patch antennas,
wherein the first and second patch antennas each include a patch element separated from a ground plane element with an air gap, and wherein the patch element is rectangular with a width ranging from 5 cm to 10 cm and a length ranging from approximately 5 cm to 10 cm, and wherein the separation between the patch element and the ground plane ranges from approximately 5 mm to 10 mm.

11. The microwave heating apparatus of claim 10, wherein the patch element is rectangular with a width of approximately 8.3 cm and a length of approximately 6.125 cm.

12. The microwave heating apparatus of claim 10, wherein the at least two patch antennas have a directivity such that a corresponding beamwidth substantially directs the radiated microwaves into the predefined heating zone proximate the respective patch antenna.

13. A microwave heating apparatus comprising:
a cavity arranged to receive a load;
at least one microwave generator that transmits electric power;
at least two patch antennas coupled to the at least one microwave generator to receive the electric power from the at least one microwave generator, wherein each of the at least two patch antennas is configured to convert the electric power into microwaves radiated into a predefined direct heating zone within the cavity proximate the respective patch antenna; and
a control unit configured to select energy levels for each of the at least two patch antennas,
wherein the at least two patch antennas each include a patch element separated from a ground plane element with an air gap, wherein the patch element is rectangular with a width ranging from 5 cm to 10 cm and wherein the separation between the patch element and the ground plane ranges from approximately 5 mm to 10 mm.

14. The microwave heating apparatus of claim 13, wherein the separation between the patch element and the ground plane is approximately 6 mm.

* * * * *